United States Patent
Boudreau et al.

(10) Patent No.: US 8,528,100 B2
(45) Date of Patent: Sep. 3, 2013

(54) SOFTWARE LICENSE RECONCILIATION WITHIN A CLOUD COMPUTING INFRASTRUCTURE

(75) Inventors: Michael K. Boudreau, Orange, CA (US); Jamie B. Marsnik, Minneapolis, MN (US); Bradley T. Moore, Dana Point, CA (US); Clinton W. Wright, Lakewood, CO (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 13/235,353

(22) Filed: Sep. 17, 2011

(65) Prior Publication Data
US 2013/0074189 A1 Mar. 21, 2013

(51) Int. Cl.
*H04L 29/06* (2006.01)
*G06F 21/00* (2013.01)

(52) U.S. Cl.
USPC .............................................. 726/26; 705/59

(58) Field of Classification Search
USPC ........................................... 726/26; 705/59
See application file for complete search history.

(56) References Cited

U.S. PATENT DOCUMENTS

| | | | | |
|---|---|---|---|---|
| 6,574,612 | B1 | 6/2003 | Baratti et al. | 705/59 |
| 7,752,138 | B1 | 7/2010 | Dean et al. | 705/59 |
| 2006/0106728 | A1 | 5/2006 | Yellai et al. | 705/59 |
| 2008/0083040 | A1* | 4/2008 | Dani et al. | 726/28 |
| 2009/0276771 | A1 | 11/2009 | Nickolov et al. | 717/177 |
| 2011/0047540 | A1 | 2/2011 | Williams et al. | 717/178 |
| 2011/0131315 | A1* | 6/2011 | Ferris et al. | 709/224 |
| 2011/0296402 | A1* | 12/2011 | Heyman et al. | 717/176 |
| 2012/0072898 | A1 | 3/2012 | Pappas et al. | 717/171 |
| 2012/0130911 | A1* | 5/2012 | Maclellan et al. | 705/310 |
| 2012/0136738 | A1* | 5/2012 | Meuer et al. | 705/26.1 |
| 2012/0204270 | A1* | 8/2012 | Paulino et al. | 726/28 |
| 2012/0293831 | A1* | 11/2012 | Burke, Jr. | 358/1.15 |
| 2012/0311564 | A1* | 12/2012 | Khalid | 718/1 |

* cited by examiner

*Primary Examiner* — Techane Gergiso
(74) *Attorney, Agent, or Firm* — Ido Tuchman; Steven Bennett (57) ABSTRACT

A method, system, and computer program product for managing software program installations in a cloud computing environment. An example method includes calculating, by a computer processor, a maximum number of software licenses that could be required according to a software license rule from a software license agreement to run a set of software program instances on a set of servers configured as a computing cloud. Each software program instance is an installation of the software program on a different logical partition, and at least two of the servers from the set of servers are capable of requiring a different number of software licenses according to the software license rule. The method also includes determining if the maximum number of software licenses exceeds an allowed number of software licenses granted in the software license agreement.

19 Claims, 9 Drawing Sheets

SOFTWARE LICENSE RECONCILIATION WITHIN A CLOUD COMPUTING INFRASTRUCTURE

BACKGROUND

The present invention is directed towards cloud computing and more particularly to the management of software licenses in a cloud computing environment.

With the rise of the Internet many new technologies have developed to increase productivity and efficiency for users. Cloud computing environments have evolved that enable users to share certain resources. Additionally, software may be installed on resources in the computer cloud. Often, software manufacturers do not sell software but rather licenses to use software. Software licenses can define the rights to install and/or use a set of software packages.

BRIEF SUMMARY

An example embodiment of the present invention is a method of managing software program installations in a cloud computing environment. The method includes calculating, by a computer processor, a maximum number of software licenses that could be required according to a software license rule from a software license agreement to run a set of software program instances on a set of servers configured as a computing cloud. Each software program instance is an installation of the software program on a different logical partition, and at least two of the servers from the set of servers are capable of requiring a different number of software licenses according to the software license rule. The method also includes determining if the maximum number of software licenses exceeds an allowed number of software licenses granted in the software license agreement.

Another example embodiment of the present invention is a system for managing software program installations in a cloud computing environment. The system includes a software license rule from a software license agreement. The system includes a set of software program instances. Each software program instance is an installation of the software program on a different logical partition. The system includes a set of servers configured as a computing cloud. At least two of the servers from the set of servers in the cloud are capable of requiring a different number of software licenses according to the software license rule. The system also includes a computer processor configured to calculate according to the software license rule a maximum number of software licenses that could be required to run the set of software program instances on the set of servers.

Yet another example embodiment of the invention is a computer program product embodied in non-transitory computer readable memory for managing software program installations in a cloud computing environment. The computer program product includes a computer readable non-transitory storage medium having computer readable program code embodied therewith. The computer readable program code is configured to calculate, by a computer processor, the maximum number of software licenses that could be required according to a software license rule in a software license agreement to run a set of software program instances on a set of servers configured as a computing cloud. Each software program instance is an installation of the software program on a different logical partition, and at least two of the servers from the set of servers are capable of requiring a different number of software licenses according to the software license rule. The computer readable program code is also configured to determine if the maximum number of software licenses exceeds an allowed number of software licenses granted in the software license agreement.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-9. As discussed in detail below, embodiments of the present invention include a method, system and computer program product for managing software program installations in a cloud computing environment.

Figure 1:
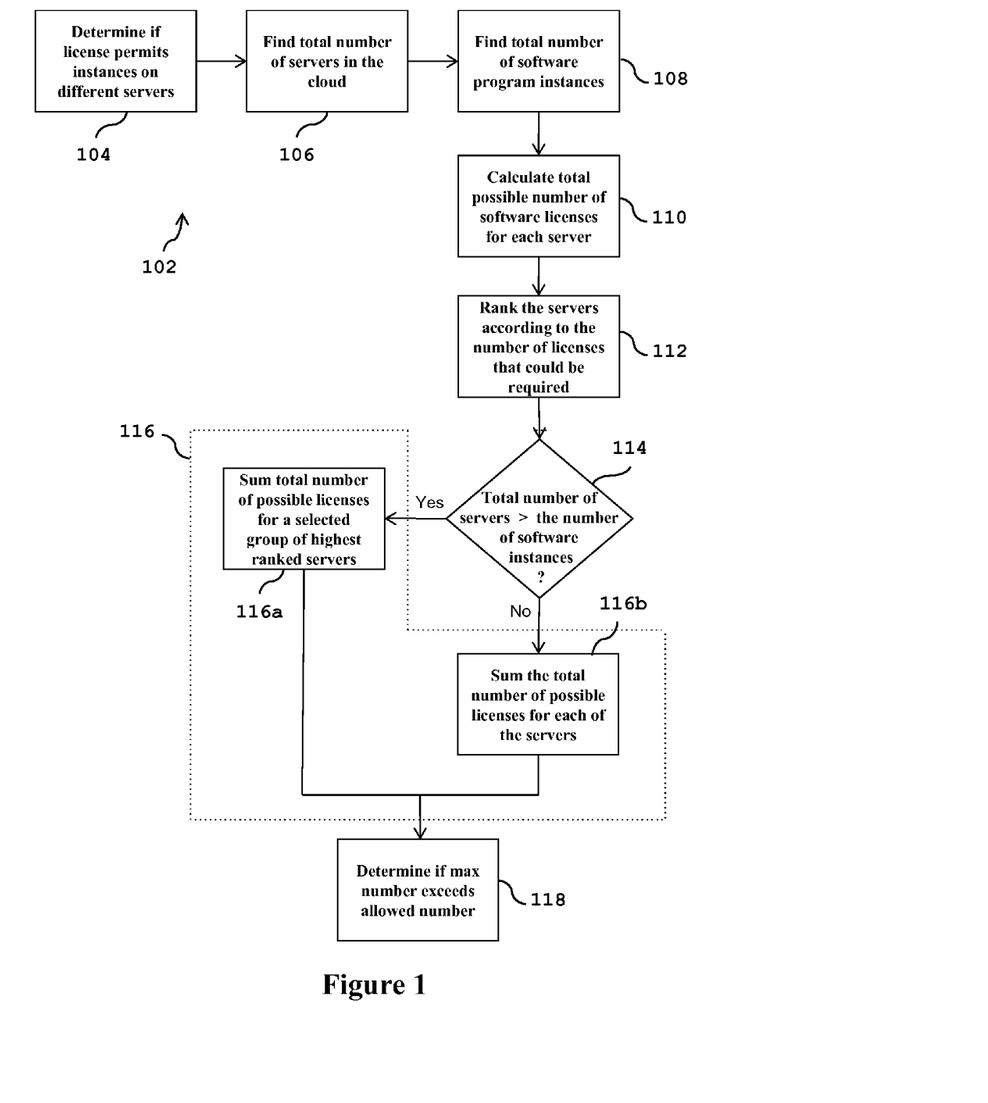
FIG. 1 shows an example embodiment of a method of managing software program installations in a cloud computing environment.

FIG. 1 shows an example embodiment of a method 102 of managing software program installations in a cloud computing environment contemplated by the present invention. In one embodiment, the method 102 includes a license permission determining step 104 of determining if a software license agreement permits a software program instance from the set of software program instances to be run on different servers from a set of servers configured as a computing cloud.

In one embodiment, each software program instance is an installation of a software program on a different logical partition. At least two of the servers from the set of servers may be capable of requiring a different number of software licenses according to the software license rule. Each of the servers from the set of servers configured as a computing cloud may be a computing unit with a fixed number of computer processors. The computing unit may be capable of running software program instances from different logical partitions. Unless otherwise stated, the term server or servers refers to a server or servers from the set of servers configured as a computing cloud, and the term software program instance or software program instances refers to a software program instance or software program instances from the set of software program instances. The term computing cloud or cloud refers to a group of computing devices connected to a network in a manner such that resources can be shared among the computing devices. Resources may include, for example, computation, software, data access, and storage services.

In one embodiment, licensing is based on attributes of the hardware of the servers. In a cloud computing environment, the software may be installed on a disk or logical partition that can "move" dynamically in between physical systems capable of accessing the software (e.g., servers). In other words, the logical partition may become associated with a particular server for a period of time before being moved and associated with a different server for another period of time. In one embodiment, a cloud computing environment includes virtualized systems that can be associated with different hardware servers. A virtualized system may include an image that contains software. A server may be a computerized unit that will perform processing. In one embodiment, the server includes a set number of computer processors. Each server may have a respective MAC address belonging to the server.

In one embodiment, the software license agreement requires a license if the software is installed on a system. In one embodiment, the software license agreement requires a license if the software is associated with a server. In another embodiment, the software license agreement requires a license if the software is running or being used on a server.

In one example scenario, three logical partitions out of sixty logical partitions in a cloud computing environment may have a particular software instance installed. If the computing cloud has ten servers, a license may be required, in a worst case scenario, for a maximum of three of the servers if the software license rule in the license agreement provides that each server must be licensed during the time the software instance is associated with the server. If the three logical partitions with the software are all associated with one server, then in this best case scenario only one license may be required.

In one embodiment, the license agreement provides that a license must be maintained for each of the computer processors on the server to which logical partition with the software is associated. For example, if one of the ten servers has five processors and one of the servers has two processors, then five licenses may be required if a logical partition with the software instance is associated with the server with five processors; but only two licenses may be required if the logical partition with the software instance is associated with the server with two processors. If the remaining eight servers each have only one processor, then the maximum number of licenses that could be required for the software would be eight because five licenses are required for the five processor server, two licenses are required for the two processor server, and one license is required for one of the eight servers. It may be possible, however, that the three logical partitions with the software are all associated with one of the eight servers having a single processor. In this case, only one license may be required. Thus, the maximum number of licenses required may be based on a worst case scenario of where the logical partitions could be associated.

The method 102 may include a server counting step 106 of finding a total number of servers in the set of servers configured as a computing cloud. The method 102 may include a software instance counting step 108 of finding a total number of software program instances in the set of software program instances. In one embodiment, the method 102 includes a license requirement calculating step 110 of calculating for each server a total number of software licenses that could be required according to a software license rule in a software license agreement to run on the server a software program instance from the set of software program instances. The license requirement calculating step 110 may include multiplying a number of computer processor cores belonging to the server by a processor value unit associated with the server.

The method 102 may also include a server ranking step 112 of ranking the servers according to each of the corresponding total number of software licenses that could be required to run on the server a software program instance. The method 102 may also include a comparing step 114 of comparing the total number of servers to the total number of software program instances.

The method 102 may include a maximum licenses calculating step 116 of calculating, by a computer processor, a maximum number of software licenses that could be required according to a software license rule from a software license agreement to run a set of software program instances on a set of servers configured as a computing cloud.

If the total number of servers is greater than the total number of software program instances, the maximum licenses calculating step 116 may include a selective summing step 116a of summing together for a selected group of servers each of the corresponding total number of software program licenses that could be required. In one embodiment, the selected group of servers is equal in number to the total number of software program instances. The selected group of servers may be the highest ranked servers in terms of the total number of software licenses that could be required.

If the total number of servers is not greater than the total number of software program instances, the maximum licenses calculating step 116 may include a non-selective summing step 116b of summing together each of the total number of software licenses that could be required. In one embodiment, the server ranking step 112, and/or other steps described herein may be included in calculating the maximum number of software program licenses that could be required. For example, the server ranking step 112 may be performed after the comparing step 114 only if the total number of servers is greater than the total number of software program instances.

The method 102 may also include a determining step 118 of determining if the maximum number of software licenses exceeds an allowed number of software licenses granted in the software license agreement.

Figure 2:
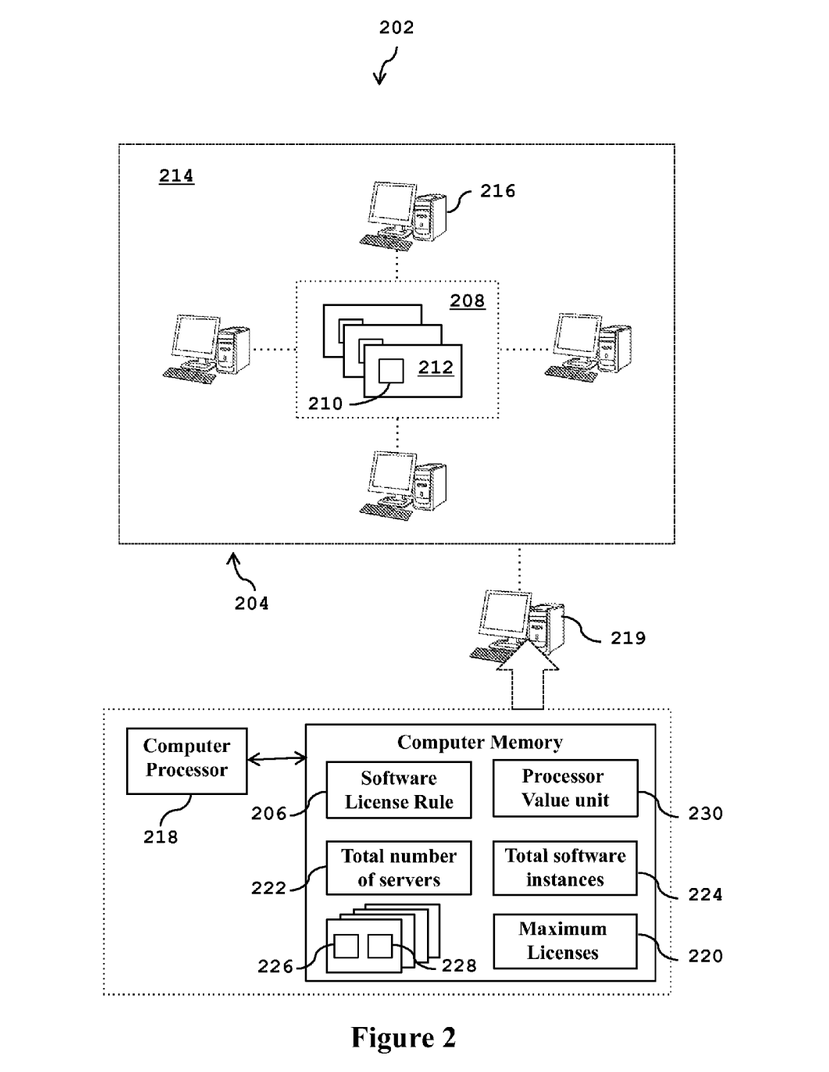
FIG. 2 shows an example embodiment of a system for managing software program installations in a cloud computing environment.

FIG. 2 shows an example embodiment of a system 202 for managing software program installations in a cloud computing environment 204 contemplated by the present invention. The system 202 may include a software license rule 206 from a software license agreement. The system 202 may also include a set 208 of software program instances 210. In one embodiment, each software program instance 210 is an installation of the software program on a different logical partition 212.

The system 202 may include a set 214 of servers 216 configured as a computing cloud 204. At least two of the servers 216 from the set 214 of servers 216 in the cloud 204 may be capable of requiring a different number of software licenses according to the software license rule 206. Each of the servers 216 from the set 214 of servers 216 configured as a computing cloud 204 may be a computing unit with a fixed number of computer processors. Each computing unit may be capable of running software program instances 210 from different logical partitions 212. The system 202 may include a computer processor 218 configured to calculate according to the software license rule 206 a maximum number 220 of software licenses that could be required to run the set 208 of software program instances 210 on the set 214 of servers 216.

In one embodiment, the computer processor 218 is part of one of the servers 216 in the set 214 of servers 216 configured as a computing cloud 204. In another embodiment, the computer processor 218 is part of a separate system 219 capable of communicating to the set 214 of servers 216 configured as a computing cloud 204. The dotted lines from the separate system 219 to the computing cloud 204 indicates a network connection between the separate system 219 and set 214 of servers 216 in the computing cloud 204. Additionally, the set 214 of servers 216 may be connected to a network, and the network may include the logical partitions 212.

In one embodiment, the computer processor 218 is configured to determine if the software license agreement permits a software program instance 210 from the set 208 of software program instances 210 to be run on different servers 216 from the set 214 of servers 216 configured as a computing cloud 204. The computer processor 218 may be further configured to find a total number 222 of servers 216 in the set 214 of servers 216 configured as a computing cloud 204. In one embodiment, the computer processor 218 is configured to find a total number 224 of software program instances 210 in the set 208 of software program instances 210. The computer processor 218 may be configured to compare the total number 222 of servers 216 to the total number 224 of software program instances 210.

In one embodiment, the computer processor 218 is configured to calculate for each server 216 a total number 226 of software licenses that could be required according to the software license rule 206 in the software license agreement to run on the server 216 a software program 210. In one embodiment, the computer processor 218 is configured to calculate for each server 216 the total number 226 of software licenses that could be required by multiplying a number 228 of computer processor cores belonging to the server 216 by a processor value unit 230 associated with the server 216. The computer processor 218 may be configured to rank the servers 216 according to each of the corresponding total number 226 of software licenses that could be required to run on the server 216 a software program instance 210.

If the total number 222 of servers 216 is greater than the total number 224 of software program instances 210, the computer processor 218 may be configured to calculate according to the software license rule 206 a maximum number 220 of software licenses that could be required by summing together for a selected group of servers from the set 214 of servers 216 each of the corresponding total number 226 of software program licenses that could be required. The selected group of servers 216 may be equal in number to the total number 224 of software program instances 210. In one embodiment, the selected group of servers 216 may be the highest ranked servers 216 in terms of the total number 226 of software licenses that could be required.

If the total number 222 of servers 216 is not greater than the total number 224 of software program instances 210, the computer processor 218 may be configured to calculate according to the software license rule 206 a maximum number 220 of software licenses that could be required by summing together each of the total number 226 of software licenses that could be required.

Figure 3:
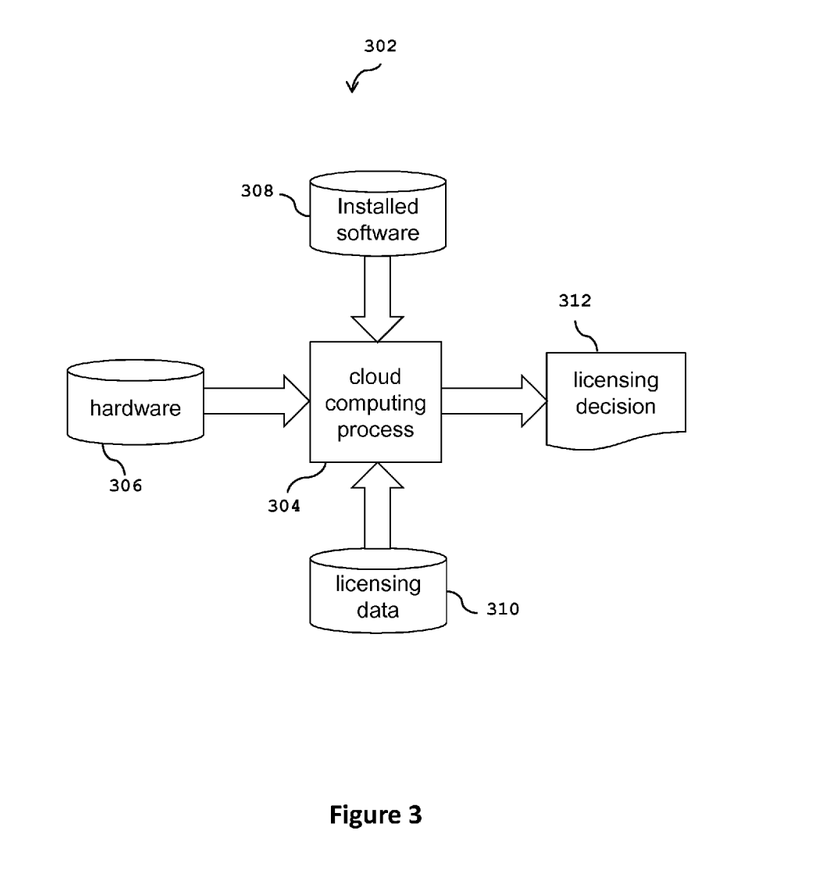
FIG. 3 shows an example embodiment of a system for a cloud computing process.

FIG. 3 shows an example embodiment of a system 302 for a cloud computing process 304 contemplated by the present invention. The cloud computing process 304 may be configured to perform the steps of the methods described herein. The cloud computing process 304 may be configured to receive information from hardware 306, installed software 308, and licensing data 310. The cloud computing process 304 may output a licensing decision 312.

Figure 4:
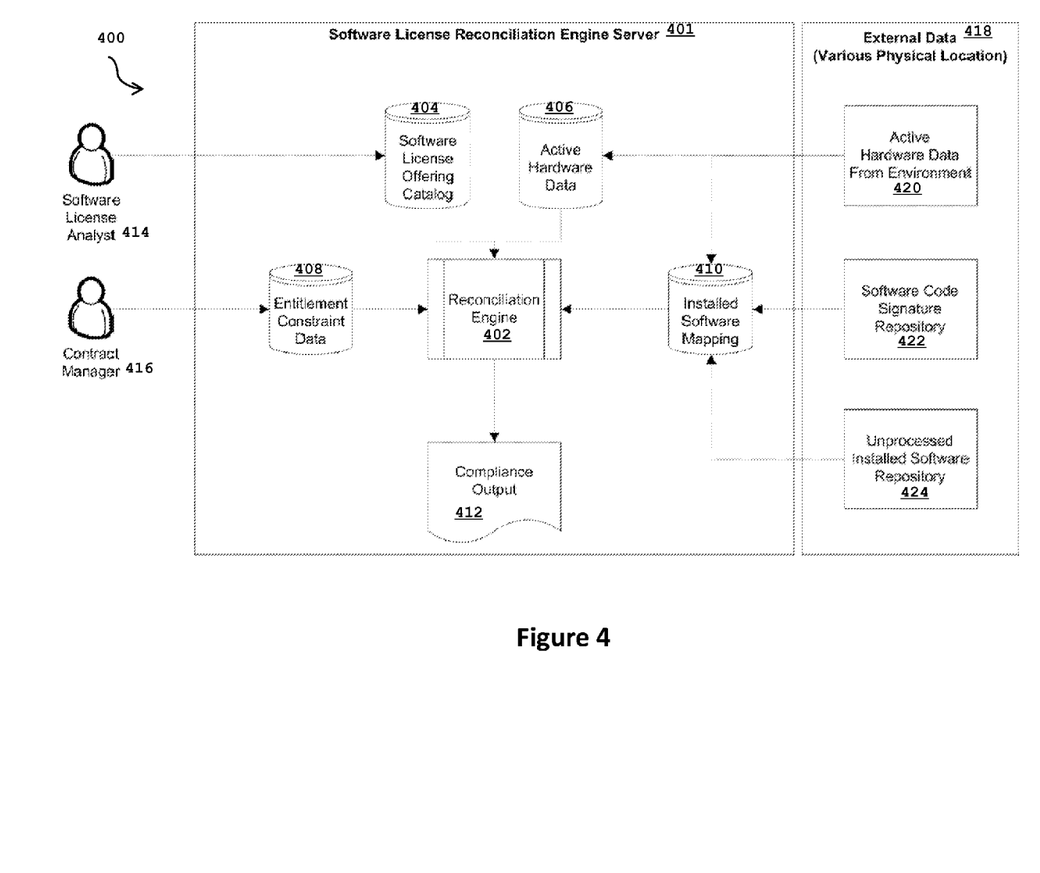
FIG. 4 shows an example embodiment of a Software License Reconciliation System in accordance with the present invention.

FIG. 4 shows an example embodiment of a Software License Reconciliation System 400 of the present invention having a Software License Reconciliation Engine Server 401 and External Data 418 stored in various physical locations. Software License Reconciliation Engine Server 401 may include a Software License Offering Catalog database 404 for storing a software license offering catalog, an Active Hardware Data database 406 for storing discovered active hardware data, an Entitlement Constraint Data database 408 for storing entitlement constraint data, an Installed Software database 410 for storing discovered, installed software data and a Reconciliation Engine 402 for receiving inputs from these sources and providing Compliance Output 412.

External Data 418 may provide the Active Hardware Data database 406 with discovered active hardware date from Environment 420 identifying all of the discovered active hardware in the environment. Active hardware may be identified using, for example, a hardware scanner. One example of a hardware scanner is IBM Tivoli Monitoring 6.1 software. A Software Code Signature Repository 422 may provide software code signature repository data. Installed Software from Environment 424 may provide all installed software as identified by, for instance, a software scanner, to Installed Software database 410.

Software License Analyst 414 may access the Software License Offering Catalog database 404 for selecting and purchasing/licensing software offerings for installation/use in the environment. The appropriate attributes may be set or reset and the artifacts from the licensed software offerings may be installed in the environment and, subsequently, detected by, for example, a scanner and may be uploaded to Installed Software database 610.

A Contract Manager 416 may access the Entitlement Constraint database 408 for entering the entitlement constraints on the software offerings. This is generally done when the software offering is made available on the Software License Offering Catalog 404.

The Reconciliation Engine 402 may receive inputs from the Software License Offering Catalog 404, the Active Hardware Data database 406, the Installed Software database 410, and the Entitlement Constraint Data database 408 for, among other things, determining which of the installed software are entitled and which are not and producing Compliance Output 412.

The Software License Reconciliation System 400 may be configured to perform the methods described herein. The Software license Reconciliation System 400 may be able to scan the servers and logical partitions to perform a maximum required license calculation. The maximum required license calculation may be provided to a user in a reconciliation report that recommends the number of licenses to obtain. In one embodiment, the Software License Reconciliation System 400 is automated to produce a reconciliation report at a specified time.

Figure 5:
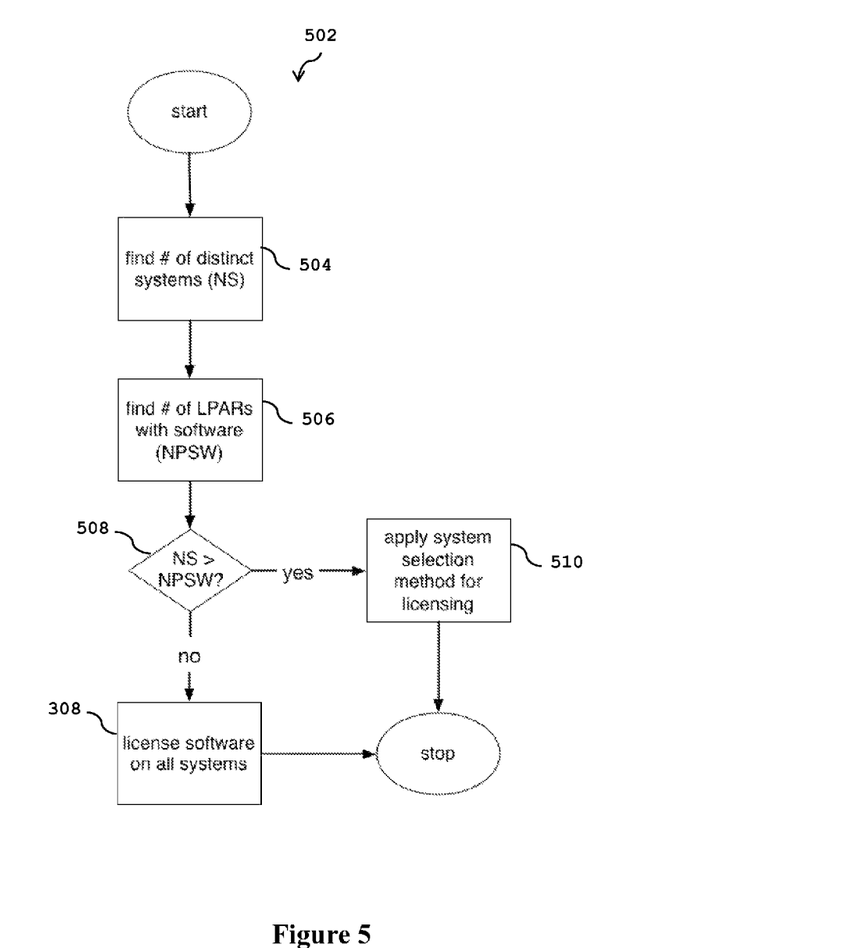
FIG. 5 shows another embodiment of a method for managing software program installations in a cloud computing environment.

FIG. 5 shows another embodiment of a method 502 for managing software program installations in a cloud computing environment. The method 502 may include a system finding step 504 of finding a number of distinct systems. Distinct systems may include, for example, servers each with a dedicated number of computer processors. The method 502 may include a partition finding step 506 of finding a number of logical partitions with relevant software on them. In one embodiment, the method 502 includes a comparing step 508 of comparing the number of distinct systems to the number of logical partitions with relevant software.

If the number of systems is greater than the number of logical partitions with relevant software, the method may include a system selection applying step 510 of applying a system selection method for licensing. In one embodiment, the system selection method includes determining a total number of software licenses that could be required to run the relevant software on the system. The system selection method may also include ranking the systems by the total number of software licenses that could be required. If the number of systems is less than or equal to the number of logical partitions with relevant software, the method may include a non-selective licensing step 512 of licensing software on all systems.

Figure 6:
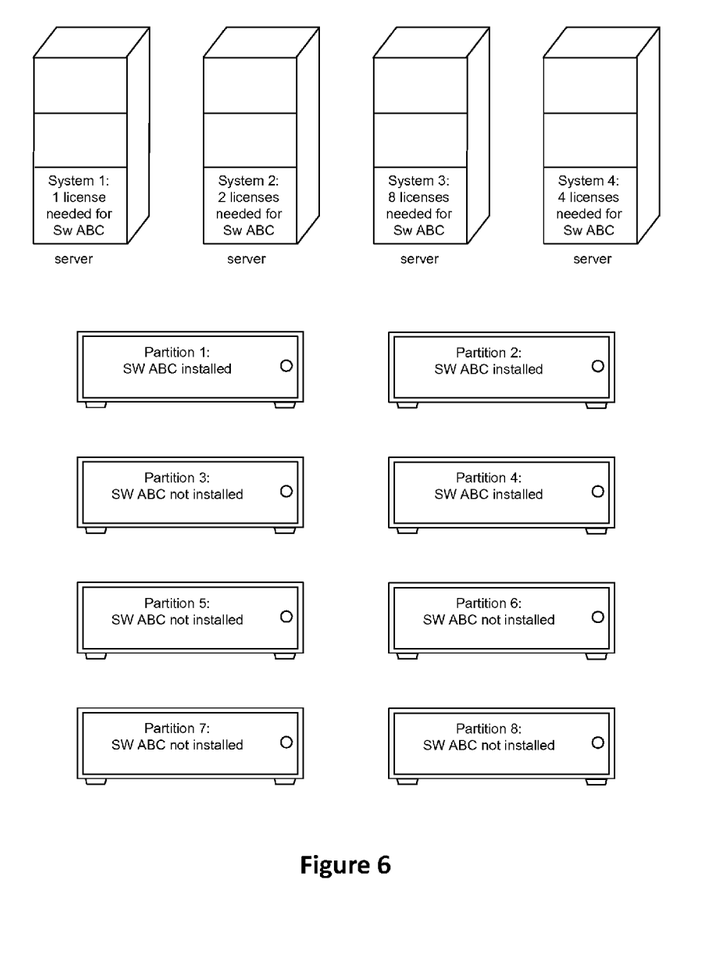
FIG. 6 shows an example scenario in which the number of systems is greater than the number of logical partition with software ABC installed.
Figure 7:
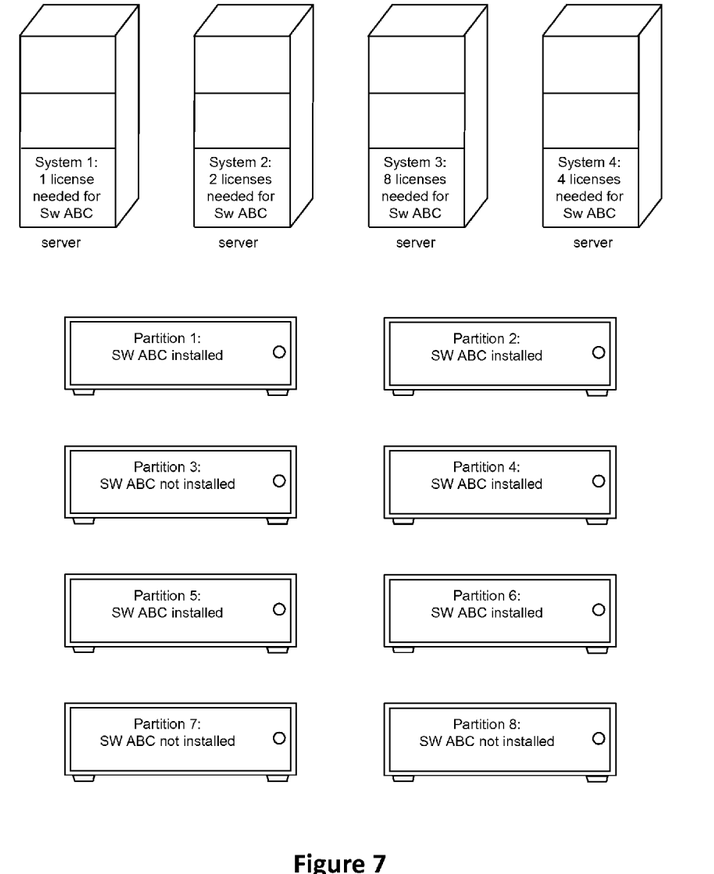
FIG. 7 shows an example scenario in which the number of systems is less than the number of logical partition with software ABC installed.
Figure 8:
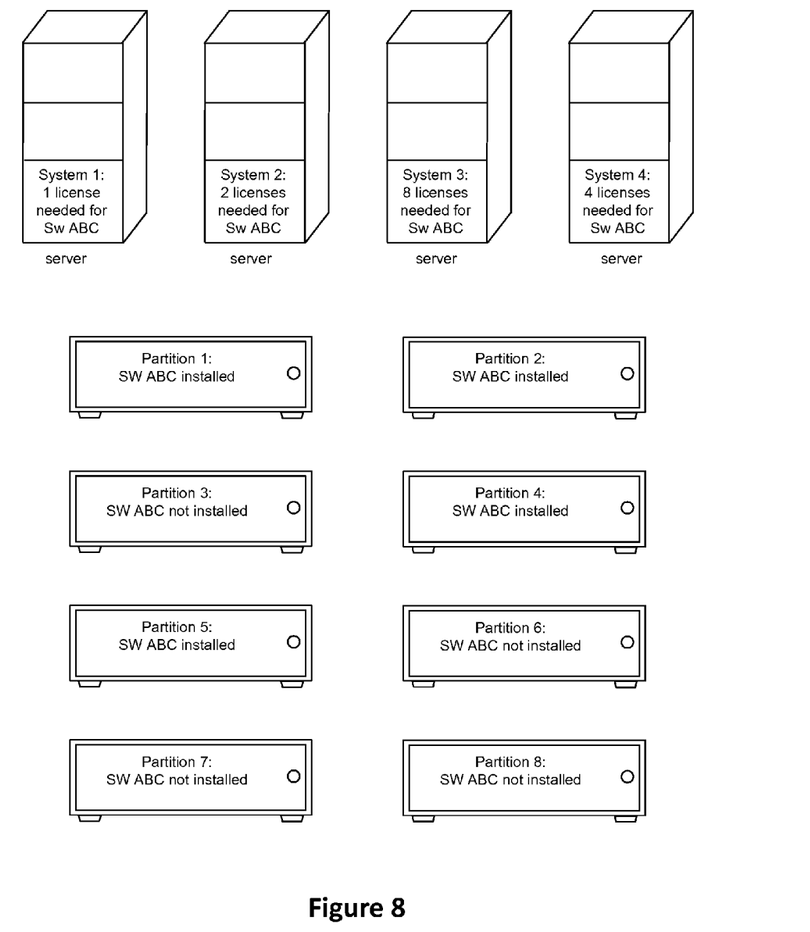
FIG. 8 shows an example scenario in which the number of systems is equal to the number of logical partitions with software ABC installed.

FIGS. 6-8 describe example scenarios encountered under the method 502 of FIG. 5. Each of the example scenarios includes a system 1, system 2, system 3, and system 4. System 1 requires one license in order to run software ABC. System 2 requires two licenses in order to run software ABC. System 3 requires eight licenses in order to run software ABC. System 4 requires four licenses in order to run software ABC. Each of the example scenarios includes eight logical partitions. In one example of a cloud computing environment, each logical partition may be freely associated with any of the systems.

FIG. 6 shows an example scenario in which the number of systems is greater than the number of logical partitions with software ABC installed. Partition 1, partition 2, and partition 4 each have an instance of software ABC installed. The number of licenses needed for software ABC may be calculated by the following two steps. Step 1 may first include determining the number of systems to be licensed. In this case, there are only three partitions with software ABC. Therefore, the maximum number of systems that can show software ABC installed at any given time is three. Therefore, the number of systems that needs to be licensed is three. Step 2 may include determining which systems to be used in determining the number of licenses need. Software licensing may require making sure there are enough licenses to cover the installations. Since the logical partitions may be used through any of the systems, the three systems requiring the most licenses are used to calculate the maximum number of licenses required.

FIG. 7 shows an example scenario in which the number of systems is less than the number of logical partition with software ABC installed. In this scenario, partition 1, partition 2, partition 4, partition 5, and partition 6 each have an instance of software ABC installed. In this case, the maximum number of licenses required for software ABC may be calculated by simply adding the number of licenses needed for all four systems.

FIG. 8 shows an example scenario in which the number of systems is equal to the number of logical partitions with software ABC installed. In this scenario, partition 1, partition 2, partition 4, and partition 5 each have an instance of software ABC installed. In this case, the maximum number of licenses need may be calculated by adding the licenses needed for all four systems.

Figure 9:
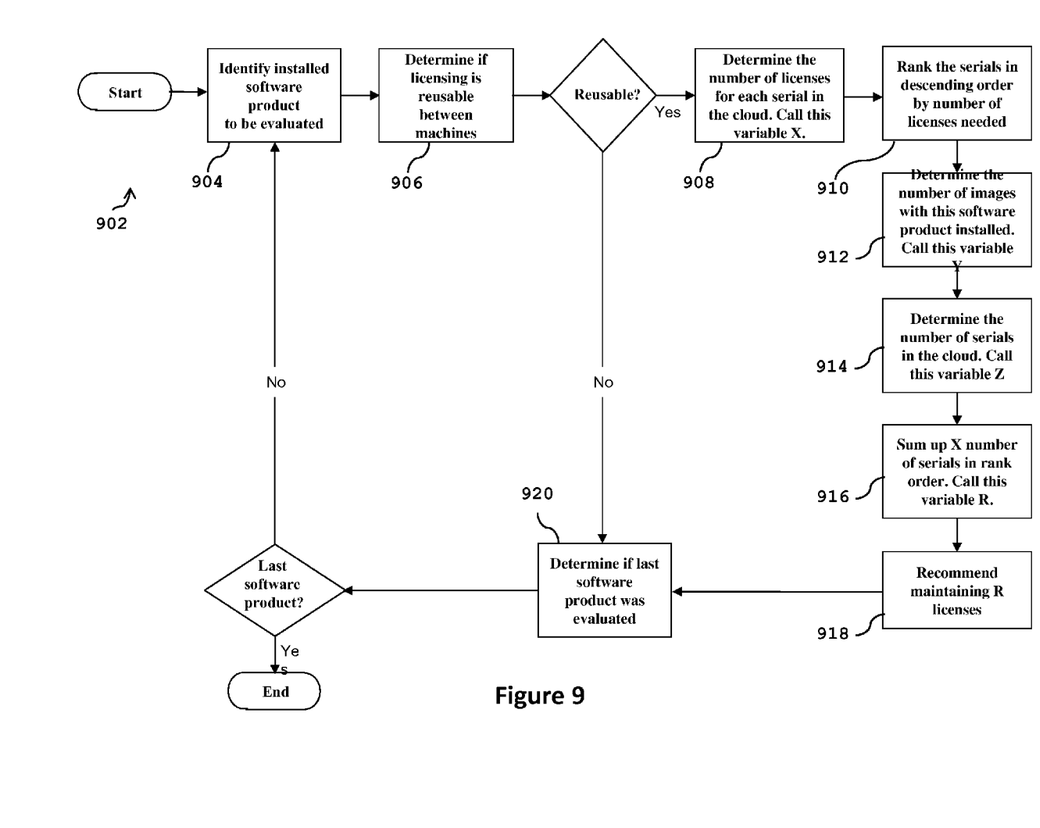
FIG. 9 shows an additional example embodiment of a method of managing software program installations in a cloud computing environment.

FIG. 9 shows an additional example embodiment of a method 902 of managing software program installations in a cloud computing environment. The steps of the method are illustrated by an example scenario. In one embodiment, the method 902 includes an identifying step 904 of identifying the software product to be evaluated. In this example scenario, the software product is IBM DB2 Enterprise Server Edition.

In one embodiment, the method 902 includes a reusability determining step 906 of determining if licensing is reusable between machines. In the example scenario, the reusability determining step may be accomplished by determining if the licensing for IBM DB2 Enterprise Server Edition is: a) restricted to a specific serial or set of serials (i.e., server or set of servers)? b) restricted to a specific hardware manufacturer? c) restricted to a specific hardware model or machine type? d) restricted to a specific operating system? e) restricted to a specific manufacturer's id? If the answer to any of these questions is determined to be yes, then the software is not reusable. In the case of IBM DB2 Enterprise Server Edition, the answer is no to each of these questions.

In one embodiment, the method 902 includes a license number determining step 908 of determining the number of licenses for each serial (i.e., servers) in the cloud. This number is called variable X. In the example scenario, there are 8 serials in the cloud. In one embodiment, licensing is Processor Value unit based (PVU). A PVU license calculation is performed by multiplying the number of process cores by a PVU multiplier.

In the example scenario, Serial 1 is a 4 dual core processor system. Therefore, there are 8 cores. The PVU multiplier is 120, and the number of licenses needed is 960. Serial 2 is a 2 single core processor system. Therefore, there are 2 cores. The PVU multiplier is 100, and the number of licenses needed is 200. Serial 3 is an 8 dual core processor system. Therefore, there are 16 cores. The PVU multiplier is 50, and the number of licenses needed is 800. Serial 4 is a 16 dual core processor system. Therefore, there are 32 cores. The PVU multiplier is 100, and the number of licenses needed is 3200. Serial 5 is a 2 dual core processor system. Therefore, there are 4 cores. The PVU multiplier is 50, and the number of licenses needed is 200. Serial 6 is a 4 octi core processor system. Therefore, there are 32 cores. The PVU multiplier is 50, and the number of licenses needed is 1600. Serial 7 is an 8 quad core processor system. Therefore, there are 32 cores. The PVU multiplier is 50, and the number of licenses needed is 1600. Serial 8 is a 4 single core processor system. Therefore, there are 4 cores. The PVU multiplier is 100, and the number of licenses needed is 400.

In one embodiment, the method 902 includes a serial ranking step 910 of ranking the serials in descending order by number of licenses needed. The serials are ranked as follows. Rank 1: Serial 4 requires 3200 licenses. Rank 2: Serial 6 requires 1600 licenses. Rank 3: Serial 7 requires 1600 licenses. Rank 4: Serial 1 requires 960 licenses. Rank 5: Serial 3 requires 800 licenses. Rank 6: Serial 8 requires 400 licenses. Rank 7: Serial 2 requires 200 licenses. Rank 8: Serial 5 requires 200 licenses.

In one embodiment, the method 902 includes an images determining step 912 of determining the number of images (i.e., logical partitions) with the software product installed. This number is called this variable Y. In the example scenario, there are 32 different images in this cloud, but only 4 of the images have IBM DB2 Enterprise Server Edition installed. Thus the value of Y is 4.

In one embodiment, the method 902 includes a serials determining step 914 of determining the number of serials in the cloud. This number is called variable Z. In the example scenario, Z is 8.

In one embodiment, the method 902 includes a licenses determining step 916 of summing up X number from the serials in the rank order. This number is called R and is defined as $R=SUM(Y(X))$. R is calculated for the example scenario as follows. Rank 1: Serial 4 requires 3200 licenses. Rank 2: Serial 6 requires 1600 licenses. Rank 3: Serial 7 requires 1600 licenses. Rank 4: Serial 1 requires 960 licenses. Thus R Total is 7360 licenses.

In one embodiment, the method 902 includes a recommending step 918 of recommending to maintain R licenses. Thus, for the example scenario, it is recommended to ensure licensing as well as maintenance/support for a total 7360 IBM DB2 Enterprise Server Edition Licenses.

In one embodiment, the method 902 includes an alternate scenario. If the images determining step 912 had resulted in a value of Y as 12 (actually if Y is greater than or equal to 8), then the method 902 would proceed along an alternate path. In the alternate path, the licenses determining step 916 may include summing up X number of serials from the rank order R=(Y(X)). Rank 1: Serial 4 requires 3200 licenses. Rank 2: Serial 6 requires 1600 licenses. Rank 3: Serial 7 requires 1600 licenses. Rank 4: Serial 1 requires 960 licenses. Rank 5: Serial 3 requires 800 licenses. Rank 6: Serial 8 requires 400 licenses. Rank 7: Serial 2 requires 200 licenses. Rank 8: Serial 5 requires 200 licenses. Thus the total value of R is 8560 licenses.

In one embodiment, the alternate path of the method 902 includes the recommending step 918 of recommending maintaining R licenses. Thus, in the example scenario following the alternate path, it is recommended to ensure licensing as well as maintenance/support for a total 8560 IBM DB2 Enterprise Server Edition Licenses.

In one embodiment, the method 902 includes a completion evaluation step 920 of determining if the last software product was evaluated. If the last software product has been evaluated, the method 902 ends, otherwise the method 902 returns to the identifying step 904 to proceed as described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention have been described, it will be understood that those skilled in the art, both now and in the future, may make various improvements and enhancements that fall within the scope of the claims which follow. These claims should be construed to maintain the proper protection for the invention first described.

What is claimed is:

1. A method of managing software program installations in a cloud computing environment, comprising:
    calculating, by a computer processor, a maximum number of software licenses required according to a software license rule from a software license agreement to run a set of software program instances on a set of servers configured as a computing cloud, each software program instance being an installation of the software program on a different logical partition and at least two of the servers from the set of servers requiring a different maximum number of software licenses according to the software license rule;
    determining if the maximum number of software licenses exceeds an allowed number of software licenses granted in the software license agreement;
    finding a total number of servers in the set of servers configured as a computing cloud;
    finding a total number of software program instances in the set of software program instances;
    comparing the total number of servers in the set of servers configured as a computing cloud to the total number of software program instances in the set of software program instances;
    calculating for each server from the set of servers configured as a computing cloud a total number of software licenses required according to a software license rule in a software license agreement to run on the server a software program instance from the set of software program instances; and
    ranking the servers in the set of servers configured as a computing cloud according to each of the corresponding total number of software licenses required to run on the server a software program instance from the set of software program instances.

2. The method of claim 1, wherein if the total number of servers in the set of servers configured as a computing cloud is not greater than the total number of software program instances in the set of software program instances, calculating the maximum number of software program licenses required includes:
    calculating for each server from the set of servers configured as a computing cloud a total number of software licenses required according to the software license rule in the software license agreement to run on the server a software program instance from the set of software program instances; and
    summing together each of the total number of software licenses required.

3. The method of claim 1, wherein if the total number of servers in the set of servers configured as a computing cloud is greater than the total number of software program instances in the set of software program instances, calculating the maximum number of software program licenses required includes:
    summing together for a selected group of servers from the set of servers each of the corresponding total number of software program licenses required, the selected group of servers being equal in number to the total number of software program instances, the selected group of servers being the highest ranked servers in the set of servers configured as a computing cloud in terms of the total number of software licenses required.

4. The method of claim 1, wherein calculating for each server from the set of servers configured as a computing cloud the total number of software licenses required to run on the server a software program instance from the set of software program instances includes multiplying a number of computer processor cores belonging to the server by a processor value unit associated with the server.

5. The method of claim 1, further comprising:
    determining if the software license agreement permits a software program instance from the set of software program instances to be run on different servers from the set of servers configured as a computing cloud.

6. The method of claim 1, wherein each of the servers from the set of servers configured as a computing cloud is a computing unit with a fixed number of computer processors, the computing unit running software program instances from different logical partitions.

7. A system for managing software program installations in a cloud computing environment, comprising:
    a software license rule from a software license agreement;
    a set of software program instances, each software program instance being an installation of the software program on a different logical partition;
    a set of servers configured as a computing cloud, at least two of the servers from the set of servers in the cloud requiring a different maximum number of software licenses according to the software license rule; and
    a computer processing device configured to:
        calculate according to the software license rule a maximum number of software licenses required to run the set of software program instances on the set of servers;
        find a total number of servers in the set of servers configured as a computing cloud;
        find a total number of software program instances in the set of software program instances;
        compare the total number of servers in the set of servers configured as a computing cloud to the total number of software program instances in the set of software program instances;
        calculate for each server from the set of servers configured as a computing cloud a total number of software licenses required according to a software license rule in a software license agreement to run on the server a software program instance from the set of software program instances; and
        rank the servers in the set of servers configured as a computing cloud according to each of the corresponding total number of software licenses required to run on the server a software program instance from the set of software program instances.

8. The system of claim 7, wherein if the total number of servers in the set of servers configured as a computing cloud is not greater than the total number of software program instances in the set of software program instances, the computer processor is configured to calculate according to the software license rule a maximum number of software licenses required by:

calculating for each server from the set of servers configured as a computing cloud a total number of software licenses required according to the software license rule in the software license agreement to run on the server a software program instance from the set of software program instances; and     summing together each of the total number of software licenses required.

9. The system of claim 7, wherein if the total number of servers in the set of servers configured as a computing cloud is greater than the total number of software program instances in the set of software program instances, the computer processor is configured to calculate according to the software license rule a maximum number of software licenses required by:

summing together for a selected group of servers from the set of servers each of the corresponding total number of software program licenses required, the selected group of servers being equal in number to the total number of software program instances, the selected group of servers being the highest ranked servers in the set of servers configured as a computing cloud in terms of the total number of software licenses required.

10. The system of claim 7, wherein the computer processor is configured to calculate for each server from the set of servers configured as a computing cloud the total number of software licenses required by:

multiplying a number of computer processor cores belonging to the server by a processor value unit associated with the server.

11. The system of claim 7, wherein the computer processor is further configured to:

determine if the software license agreement permits a software program instance from the set of software program instances to be run on different servers from the set of servers configured as a computing cloud.

12. The system of claim 7, wherein each of the servers from the set of servers configured as a computing cloud is a computing unit with a fixed number of computer processors, the computing unit running software program instances from different logical partitions.

13. A computer program product embodied in non-transitory computer readable memory for managing software program installations in a cloud computing environment, the computer program product comprising:

a computer readable non-transitory storage medium having computer readable program code embodied therewith, the computer readable program code configured to:

calculate, by a computer processor, the maximum number of software licenses required according to a software license rule in a software license agreement to run a set of software program instances on a set of servers configured as a computing cloud, each software program instance being an installation of the software program on a different logical partition and at least two of the servers from the set of servers requiring a different maximum number of software licenses according to the software license rule; and         determine if the maximum number of software licenses exceeds an allowed number of software licenses granted in the software license agreement;

find a total number of servers in the set of servers configured as a computing cloud;

find a total number of software program instances in the set of software program instances;

compare the total number of servers in the set of servers configured as a computing cloud to the total number of software program instances in the set of software program instances;

calculate for each server from the set of servers configured as a computing cloud a total number of software licenses required according to a software license rule in a software license agreement to run on the server a software program instance from the set of software program instances; and     rank the servers in the set of servers configured as a computing cloud according to each of the corresponding total number of software licenses required to run on the server a software program instance from the set of software program instances.

14. The computer program product of claim 13, wherein if the total number of servers in the set of servers configured as a computing cloud is not greater than the total number of software program instances in the set of software program instances, the computer readable program code is configured to calculate according to the software license rule a maximum number of software licenses required by:

calculating for each server from the set of servers configured as a computing cloud a total number of software licenses required according to the software license rule in the software license agreement to run on the server a software program instance from the set of software program instances; and     summing together each of the total number of software licenses required.

15. The computer program product of claim 13, wherein if the total number of servers in the set of servers configured as a computing cloud is greater than the total number of software program instances in the set of software program instances, the computer readable program code is configured to calculate according to the software license rule a maximum number of software licenses required by:

summing together for a selected group of servers from the set of servers each of the corresponding total number of software program licenses required, the selected group of servers being equal in number to the total number of software program instances, the selected group of servers being the highest ranked servers in the set of servers configured as a computing cloud in terms of the total number of software licenses required.

16. The computer program product of claim 13, wherein the computer readable program code is configured to calculate for each server from the set of servers configured as a computing cloud a total number of software licenses required by:

multiplying a number of computer processor cores belonging to the server by a processor value unit associated with the server.

17. The computer program product of claim 13, wherein the computer readable program code is further configured to:

determine if the software license agreement permits a software program instance from the set of software program instances to be run on different servers from the set of servers configured as a computing cloud.

18. The computer program product of claim 13, wherein each of the servers from the set of servers configured as a computing cloud is a computing unit with a fixed number of computer processors, the computing unit running software program instances from different logical partitions.

19. The computer program product of claim 13, wherein each of the logical partitions is virtualized as a separate computer.

\* \* \* \* \*